(12) United States Patent
Woodward et al.

(10) Patent No.: US 6,446,670 B1
(45) Date of Patent: Sep. 10, 2002

(54) LINER AND METHOD FOR LINING A PIPELINE

(75) Inventors: Clive Anthony Woodward, Slough; Trevor George Sanders, Wokingham; Kirsten Elizabeth Atkinson, Aberdeen, all of (GB)

(73) Assignee: Thames Water Utilities Limited (GB)

( * ) Notice: Subject to any disclaimer, the term of this patent is extended or adjusted under 35 U.S.C. 154(b) by 0 days.

(21) Appl. No.: 09/646,697

(22) PCT Filed: Mar. 18, 1999

(86) PCT No.: PCT/GB99/00851
§ 371 (c)(1),
(2), (4) Date: Jan. 8, 2001

(87) PCT Pub. No.: WO99/47340
PCT Pub. Date: Sep. 23, 1999

(30) Foreign Application Priority Data

Mar. 18, 1998 (GB) ............................................. 9805801
Dec. 18, 1998 (GB) ............................................. 9828053

(51) Int. Cl.$^7$ ............................................... F16L 55/16
(52) U.S. Cl. .......................... 138/98; 138/97; 264/269; 156/287; 405/150.1
(58) Field of Search .................... 138/98, 97; 264/269; 156/287; 405/150.1

(56) References Cited

U.S. PATENT DOCUMENTS

| 4,576,205 A | * | 3/1986 | Morinaga et al. ............. 138/98 |
| 5,501,248 A | * | 3/1996 | Kiest, Jr. ..................... 138/98 |
| 6,129,119 A | * | 10/2000 | Schwert et al. ............... 138/98 |

OTHER PUBLICATIONS

European Patent Application 0 301 895 Sheard Pub date Jan. 1989.*
European Patent Application 0 708 290 Kirkegaard Pub date Jan. 1996.*
European Patent Application 6249363 Chiaki Pub date Jun. 1994.*

* cited by examiner

Primary Examiner—Patrick Brinson
(74) Attorney, Agent, or Firm—Blakely Sokoloff Taylor & Zafman

(57) ABSTRACT

The invention relates to a liner comprising a flexible material (1) with means adapted to increase the surface area thereof, and adhesive/sealant (2) and a release tape (3) with reinforcing strips (4). An example of a means of adapting the surface, whereby strips of adhesive/sealant (5) are applied to the release tape and then the flexible material (1) applied and compacted to form the profile. The liner is then formed into a tube. It may be folded into a cruciform shape. An end elevational view of a folded liner in a pipe (6) prior to application of the pipe.

41 Claims, 7 Drawing Sheets

LINER AND METHOD FOR LINING A PIPELINE

The invention relates to a liner, particularly to a liner for a pipe, tube or conduit and to a method of lining such a pipe, tube or conduit (hereinafter "pipe")

Pipes such as existing water or gas pipes often require repair as they degenerate with age. Carrying out such repairs in situ avoids the expense of excavating the pipe. However, a liner must be pliable enough to be inserted, For maximum efficiency it must not substantially reduce the effective bore of the pipe and it must maintain its integrity in the presence of defects, joint gaps and other surface irregularities likely to be encountered inside a pipe in need of repair, It is also essential that fluid is not allowed to enter any annular gap between the liner and its host pipe, so that it is normally necessary to make special provision for sealing this gap wherever the liner is terminated or punctured to allow fluid to pass out of the pipe.

It is an object of the invention to seek to provide a liner and process for installing same which can meet these criteria, without the need for special provision for sealing the annular gap.

According to a first aspect of the invention there is provided a liner for a pipe, comprising a flexible material which is formable into a tube, a major surface of which material has means adapted to increase the surface area thereof.

The means may comprise an elastomeric property of the flexible material.

The means may comprise a profile applied to the material. This is a relatively simple way to increase the surface area, particularly when the applied profile may comprise corrugations, dimples, reticulations, waves or the like.

The applied profile may permit a desired predetermined increase in length and/or bore of the tube. The increase is achievable by application of a force smaller, usually much smaller, than that required to stretch the material appreciably beyond a predetermined limit.

These means allow the tube to accommodate changes in the bore of the host pipe and to deform to match the profile of bends and other fittings and broadly to follow the contours of the internal surface of the host pipe. This in turn allows the tube to be continuously adhered to the internal surface of the hostpipe, so that special provision to seal the annular gap is not required. It also allows the location off side connections to the pipe to be made visible, by pressurising the liner, thus facilitating their location.

An adhesive/sealant, hereinafter generally referred to as "adhesive" for brevity, or one component of a two part adhesive, may be applied to the internal surface of the host pipe prior to eversion of the liner into place, or the adhesive, or the second component of a two part adhesive may be applied to the surface of the liner as described below. For reasons given below, it is preferable for the adhesive or a component of the adhesive, to be applied to the surface of the liner.

The adhesive may comprise a layer of non-setting adhesive or a non-setting component of a 2-part adhesive to which the sheet material is bonded The adhesive may comprise a material that does not require curing.

The adhesive component must be arranged to coat the internal surface of the liner prior to eversion. It would therefore be necessary to cover all the surfaces of the adhesive component that would otherwise be exposed, with a protective film, herein referred to as a release tape. The release tape is bonded only weakly to the adhesive. This allows for ease of storage, handling and use, by re-exposing the adhesive surface.

It is preferably a feature of the invention that the material should be inserted into the host pipe without being subjected to forces strong enough to cause the built in expansion capability of the material to be compromised. The principal means by which this is achieved is by arranging for most of the stress induced by the forces applied to overcome friction during the eversion process to be borne by a separate tape, filament or cable, loosely adhered to the liner along its entire length so as to distribute forces experienced by the liner evenly over its surface.

The release tape may be reinforced in a direction axially of the tube. This allows the finer to be pulled by the release tape through the pipe even against a significant resistance and without stretching the sheet material.

The material may be produced any material provided that it has the required properties to accept corrugation and to withstand the eversion process and may be formed into a tube. The material may be impervious to the fluid that the pipe is intended to convey, may be resistant to chemical attack from the said fluid and may be approved for use in contact with potable water.

The adhesive and the release tape may be applied to the exterior of the tube and the tube may be everted so that the adhesive and release tape are on the inside of the tube. This provides for ease of installation of the liner in a pipe.

The tube may be folded whereby its greatest lateral dimension is less than the diameter of the tube. This again provides for ease of insertion and use.

The tube may be formed to a cruciform shape and then flattened. This again provides for ease of installation and use.

A major component of the adhesive may comprise a butyl rubber. The adhesive may provide adhesion to a contaminated or rusty surface.

According to a second aspect of the invention there is provided apparatus for lining a pipe with a liner which is tubular, comprising means to draw the tube through the pipe, evert the tube and secure it to the pipe.

According to a third aspect of the invention there is provided apparatus for puncturing a liner in a pipe. This may comprise means to hold the punctured liner in position over a hole in the host pipe while providing relatively unrestricted fluid flow.

This provides for puncturing the material at positions where fluid is required to be allowed to flow from the pipe, for example at a branch pipe or junction. These are easily identified visually due to the flexible nature of the liner. There may be means to protect exposed surfaces of a layer of adhesive from contact with fluid in the pipe.

The apparatus may preferably be insertable into a hole in the pipe from interiorly thereof, preferably by being insertable by remote control from an exposed end of a lined part of a pipe.

According to a fourth aspect of the invention there is provided a pipe lined with a liner, as hereinbefore defined.

There may be a pipe junction which may have a fluid take-off through the liner at the junction.

A liner for a pipe and method of inserting it are hereinafter described, by way of example, with reference to the accompanying drawings.

FIG. 2b shows a result of corrugating the liner of FIG. 2a.

In order that the invention may be more fully understood embodiments thereof will now be described, by way of example only, with reference to the accompanying drawings.

Figure 1:
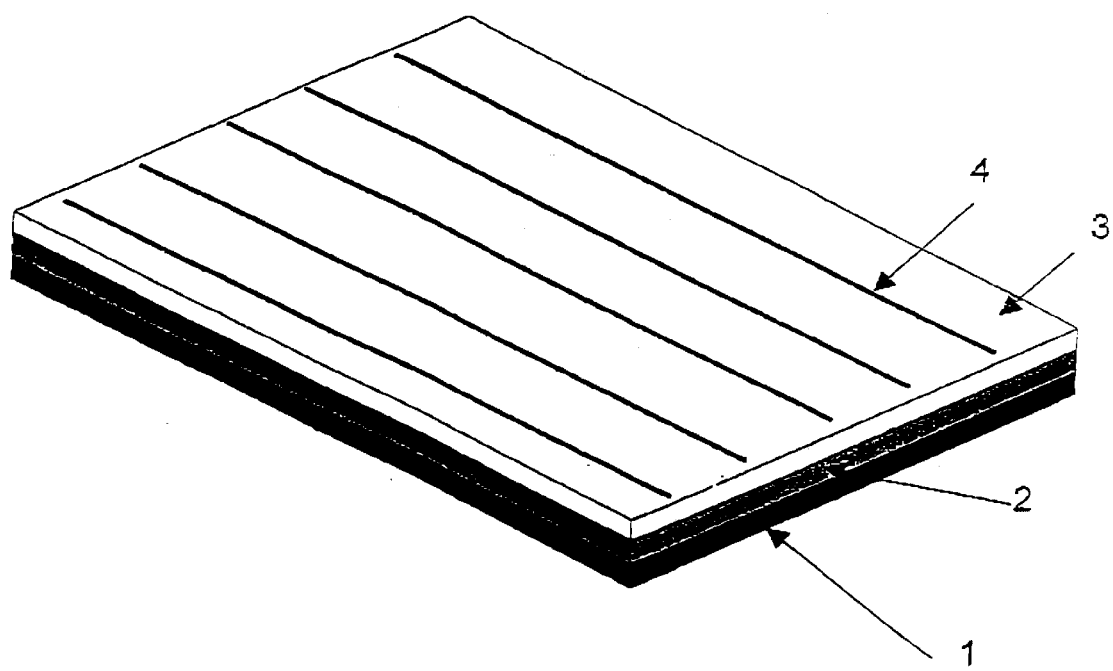
FIG. 1 is a schematic perspective view of part of a material used to make a liner according to the invention.

Referring to the drawings there is shown in FIG. 1 a liner comprising a flexible material 1 with means adapted to increase the surface area thereof, and adhesive/sealant 2 and a release tape 3 with reinforcing strips 4.

Figure 2A:
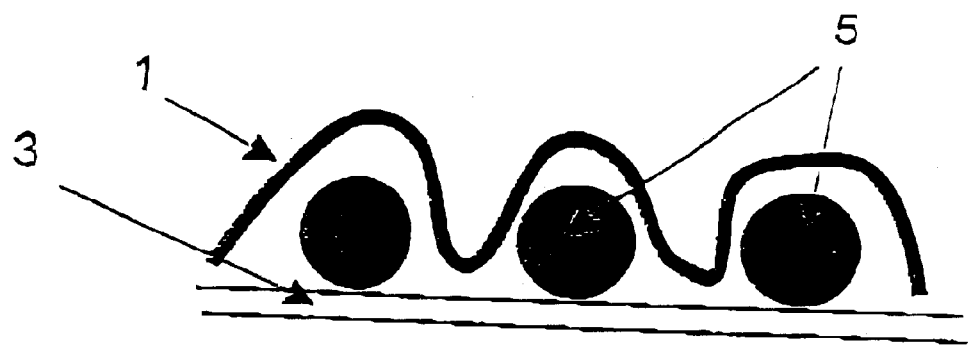
FIG. 2a shows a way of corrugating the liner.
Figure 2B:
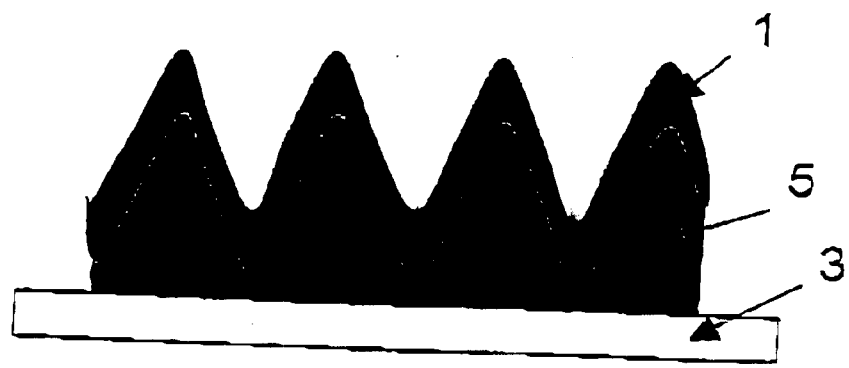

An example of a means of adapting the surface is shown in FIG. 2a, whereby strips of adhesive/sealant 5 are applied to the release tape and then the flexible material 1 applied and compacted to form the profile shown in FIG. b.

Figure 3:
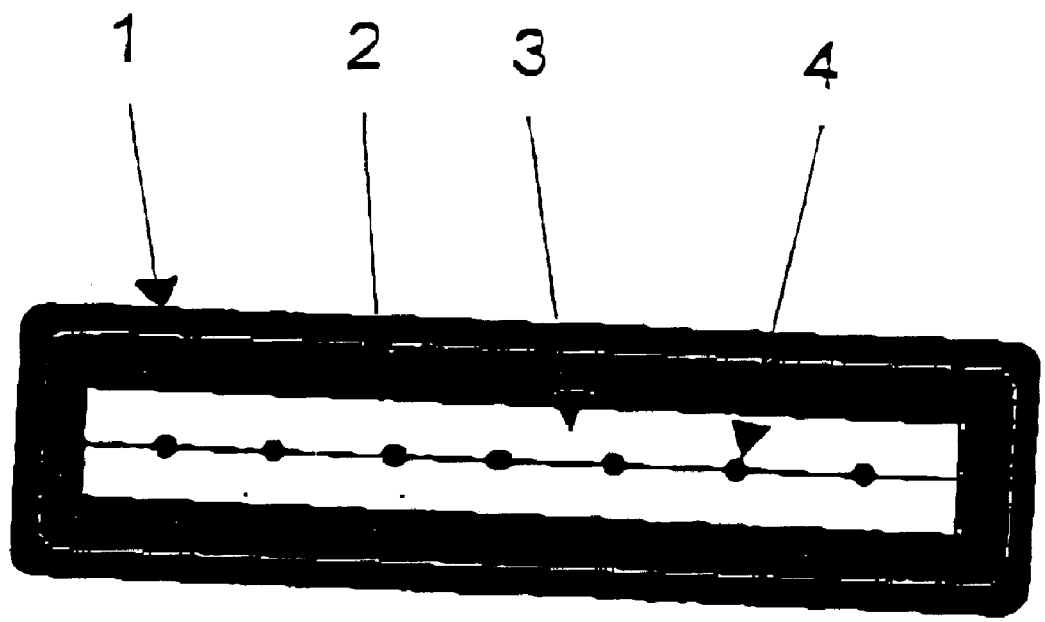
FIG. 3 shows the liner before invention.
Figure 4:
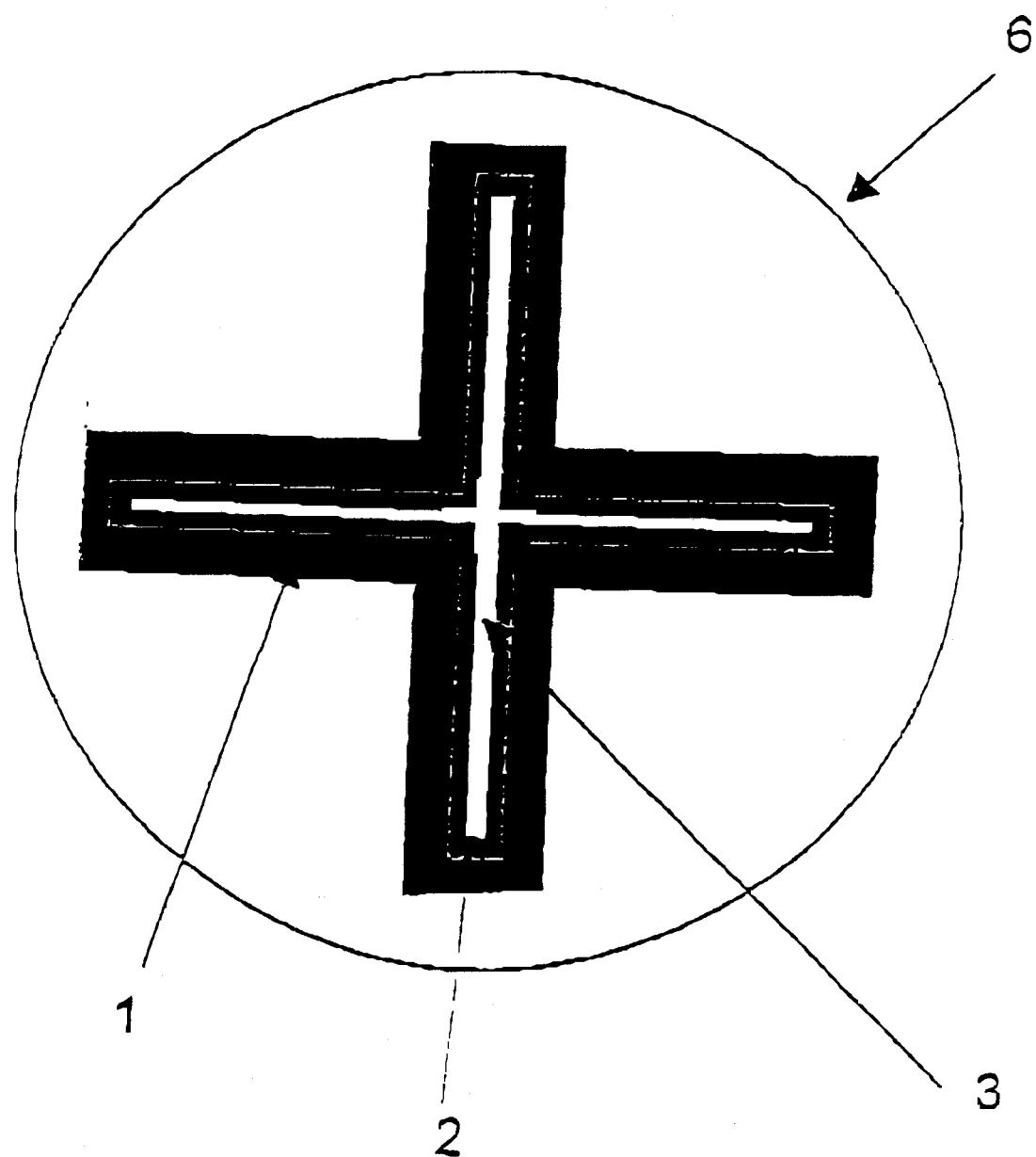
FIG. 4 is an end elevation view of a folded liner of FIG. 1, in a pipe prior to application to the pipe.

The liner is then formed into a tube as shown in FIG. 3. It may then be folded into a cruciform shape. An end elevational view of a folded liner in a pipe 6 prior to application of the pipe is shown in FIG. 4.

Figure 5:
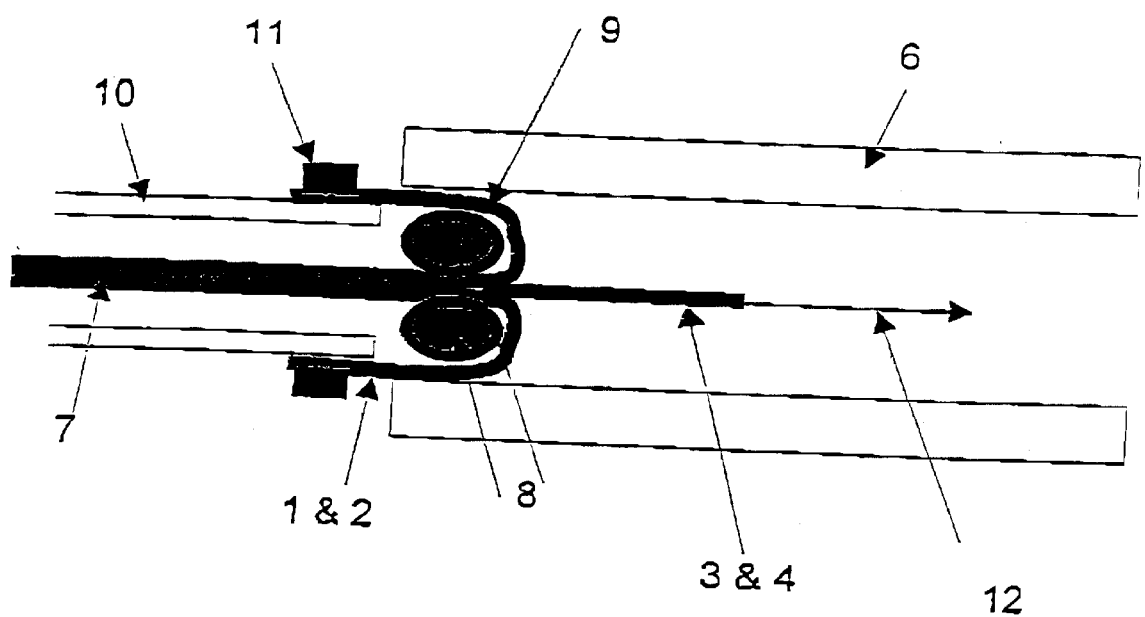
FIG. 5 shows schemetically a side elevation view at the start of application.

The folded liner is reeled onto a drum and placed inside a pressure vessel, similar to that used for conventional eversion technology, which will be familiar to those skilled in the art To line a pipe a length of the tube 7 is pulled out of the pressure vessel, and pushed through an eversion tool a. A part is opened out that is turned inside out to form a "bell" 9 with the adhesive on the outside. This is then folded over the outside of the eversion tool and a launch tube 10 on the outlet to the pressure vessel and secured using a clip 11. The free end of the release tape 3 is securely attached to a winch cable 12. The assembly is then offered to the pipe, whilst maintaining tension on the winch cable 12. The assembly is then offered to the pipe, whilst maintaining tension on the winch cable, as shown in FIG. 5.

Figure 6:
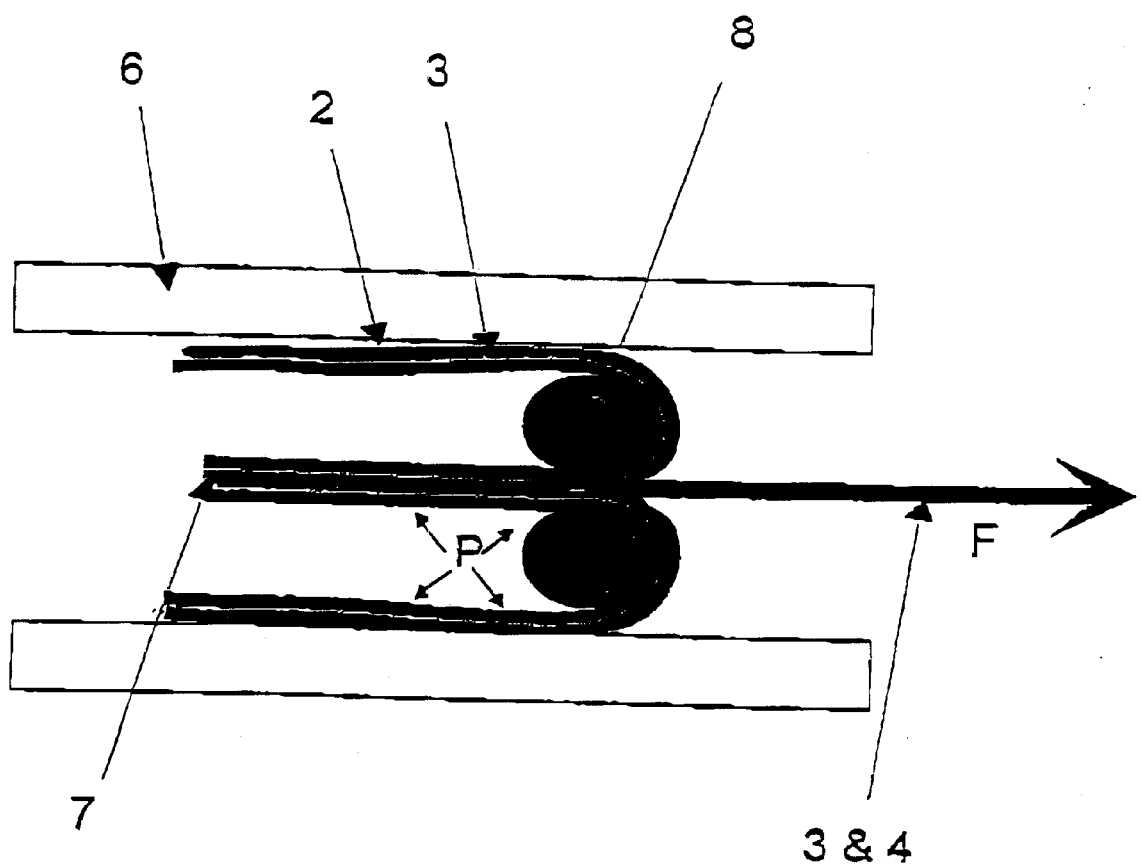
FIG. 6 shows a further stage during the, application.
Figure 7:
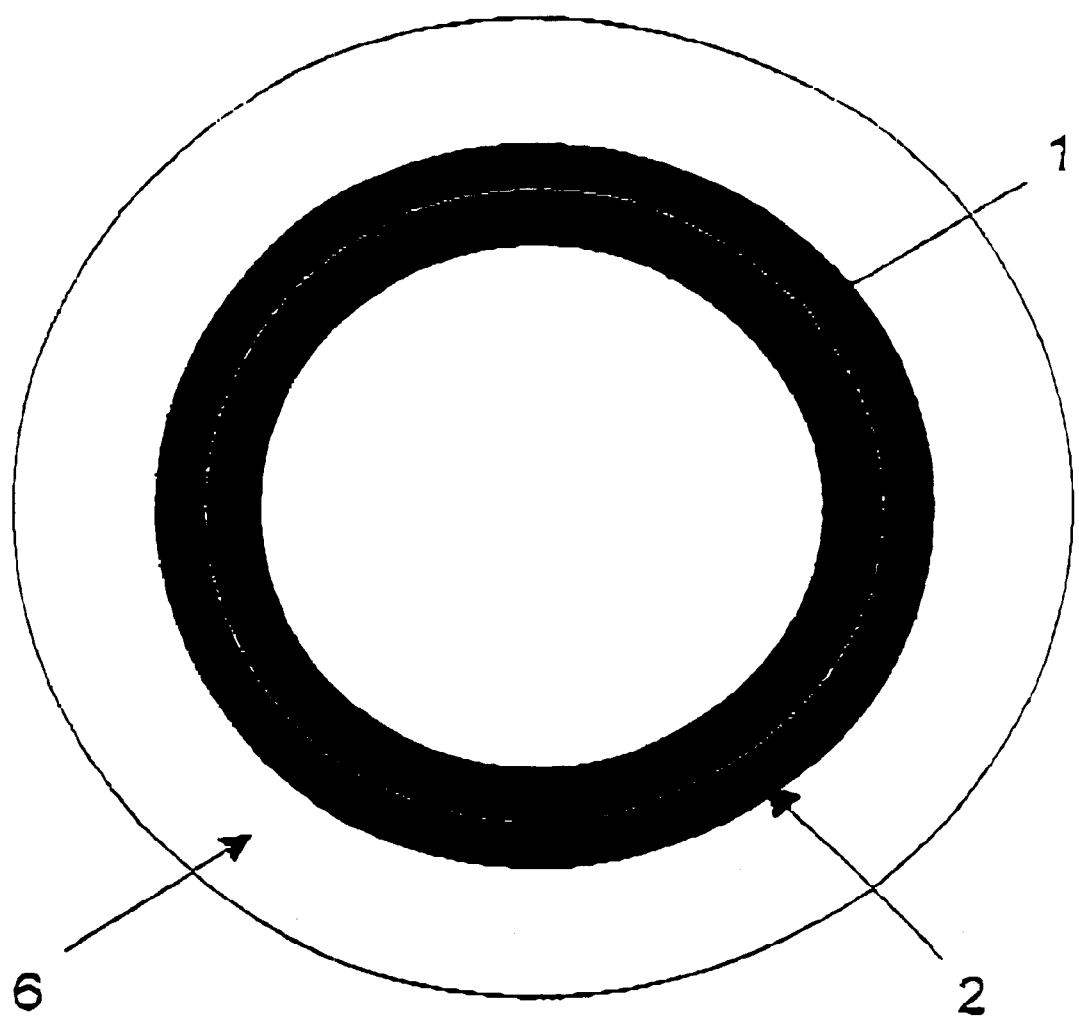
FIG. 7 shows the liner in-situ after inversion into the pipe.

The liner is pulled into the pipe by the winch using force F (FIG. 6), the eversion tool ensuring that the liner inverts evenly and the exposed surfaces of the adhesive do not come into contact with each other, but are offered evenly to the pipe surface. A positive pressure 'P' is applied from the pressure vessel to ensure that all parts of the liner are forced into contact with the pipe wall.

Thus the tube 7 is installed without removing the means for increasing the surface area of the liner. These enable the liner to "expand" over disconformities in the pipe 6 or to go round bends without the flexible material 1 stretching to within or beyond its predetermined expansion capability, which would otherwise produce a rupture or tendency to rupture, which would lead to leakage.

The expansion capability of the liner enables the liner to line sharp bends while being adhered to the outside radius of the inner wall of the host pipe, thereby minimising the tendency for air to be trapped behind the liner with consequent reduction in pipe bore.

Thus the liner 1 goes over pits, can go round even sharp bends, can be installed uninterrupted over long lengths of pipe, and therefore obviates the need for extensive excavation.

Finally, where the pipe is a main and there is a branch or junction pipe into say a dwelling, the liner goes over that junction and closes it off. It is a relatively simple matter to puncture the liner in situ by use of a robot which goes along the pipe guided by TV for visual location of the junction, and which has a device to puncture the liner precisely at the branch pipe, and insert a device if required which holds the edges of the hole in the liner in place.

Release tape should be sufficiently strong to be pulled the length of the pipe, or collected on to a roller at the connection point with a winch.

A swab can be attached to the winch so that the pipe is re-cleaned immediately prior to a bonding process and/or primed to enhance adhesion The installation is controlled by controlling the pull-through speed of the winch, and the eversion pressure.

There is thus provided by a liner as hereinbefore described with reference to the drawings, a system for lining pipes to protect their internal surfaces and to seal leaks.

The system comprises:

1) A tube of material as hereinbefore described,
2) a design of release tape and associated equipment which allows the tape to be used to pull the lining into place;
3) equipment for controlling the process of everting the lining material into the pipe, including storage and handling of materials, sealing the ends of the liner to the host pipe and ensuring that the lining is correctly positioned without risk of damage to itself or to the host pipe
4) equipment to allow the lining material to be punctured and secured to the pipe wall on the inside of connections to the original pipe.

The system will allow lining of rough and irregular internal pipe surfaces and will be capable of lining around multiple bends.

In order to prevent unwanted extension of the film during the eversion process, it is necessary to tow the un-inverted liner through the lined section of the main by means of the reinforced release tape or other adhered support, thus ensuring that the friction load is dispersed evenly along the length of the liner and eliminating the need for high inversion pressures.

At the same time, it is necessary to ensure that the everted liner expands evenly onto the wall of the host pipe without excessive creasing or pleating. This may be achieved either by maintaining a positive pressure inside the inverted section of pipe, sufficient to ensure immediate even expansion but not so great as to stress the liner, or by use of an eversion tool.

The essential components of the eversion system are thus as follows:

A means of towing the adhered support through the host pipe at a controlled speed, consistent with the capacity of the pressurised fluid supply.

A means of supplying fluid into the everted section of the liner at a controlled pressure, and at a rate consistent with the speed of the towing system.

Optionally a means of anchoring the trailing end of the liner to be everted such that it does not tend to accelerate beyond the speed of the towing line, under the influence of the fluid pressure when the length of un-everted liner is small towards the end of the lining run.

If an eversion tool is used, it should have the following characteristics:.

The internal surfaces through which the folded liner is fed must be arranged to maintain any pattern of dimples or corrugations in the liner as it passes through.

The friction between the internal surfaces of the tool and the liner must exceed that between the external surfaces of the tool and the liner by a margin sufficient to ensure that the tool, which will be otherwise unsupported, is carried along the lined pipe, remaining at all times adjacent to the point of eversion, The tool must be capable of passing any obstructions or constrictions in the host pipe.

If required, the system will allow connections to the host pipe to be re-established through the fining material without the need for access to the outside of the pipe in the vicinity of the connection, whilst retaining the ability to seal unwanted holes in the pipe.

What is claimed is:

1. A liner for a pipe, comprising:
   (i) a flexible material, the material being formed into a tube having an outer surface and an inner surface;
   (ii) means adapted to increase the surface area of the material, the means comprising a profile applied to the outer surface of the tube; and
   (iii) an adhesive applied to the inner surface of the tube.

2. A liner as defined in claim 1, wherein the applied profile comprises a profile selected from a group comprising corrugations, dimpling, reticulations and waves.

3. A liner as defined in claim 2, wherein the applied profile permits a desired predetermined increase in length of the tube.

4. A liner as defined in claim 2, wherein the applied profile permits a desired predetermined increase in bore of the tube.

5. A liner as defined in claim 1, wherein the material has a layer of adhesive.

6. A liner as defined in claim 5, wherein the adhesive comprises a layer of nonsetting adhesive to which the material is bonded.

7. A liner as defined in claim 6, wherein there is a release tape protecting an exposed surface of the adhesive.

8. A liner as defined in claim 7, wherein the release tape is reinforced in a direction axially of the tube.

9. A liner as defined in claim 1, wherein the material comprises metal.

10. A liner as defined in claim 9, wherein the material is made of metal.

11. A liner as defined in claim 1, wherein the liner comprises polymeric material.

12. A liner as defined in claim 11, wherein the material comprises polyethylene.

13. A liner as defined in claim 11, wherein the material comprises polypropylene.

14. A liner as defined in claim 11, wherein the polymeric material is cross-linked.

15. A liner as defined in claim 1, wherein the liner comprises a material approved for use in contact with potable water.

16. A liner as defined in claim 1, wherein the material is a sheet which is formed into a tube by folding and securing opposite edges together.

17. A liner as defined in claim 7, wherein the adhesive and the release tape are applied to the exterior of a formed tube and wherein the tube is everted so that the adhesive and release tape are on the inside of the tube.

18. A liner as defined in claim 17, wherein the tube is folded whereby its greatest lateral dimension is less than the diameter of the tube.

19. A liner as defined in claim 17, wherein the tube is formed to a cruciform, shape and then flattened.

20. A liner as defined in claim 5, wherein the adhesive comprises a butyl rubber.

21. A liner as defined in claim 1, wherein the applied profile is formed on the material by heated profiled-rollers.

22. A liner as defined in claim 1, wherein the applied profile is formed in the sheet material using gas jets.

23. A method of relining an existing pipe, comprising everting a liner inside a pipe, the liner comprising a flexible material formed into a tube having an outer surface and an inner surface, the material having means adapted to increase the surface area thereof after the eversion process has taken place, said means comprising a profile applied to the outer surface of the tube, and adhering the liner to the pipe, an adhesive being applied to the inner surface of the tube.

24. A method as defined in claim 23, wherein the means comprises a profile applied to the flexible material.

25. A method as defined in claim 21, wherein the applied profile is selected from a group comprising corrugations, dimpling, reticulations, and waves.

26. A method as defined in claim 23, wherein the means comprises elastomeric properties of the flexible material.

27. A method as defined in claim 24, wherein the applied profile permits a desired predetermined increase in length of the tube.

28. A method as defined in claim 24, wherein the applied profile permits a desired predetermined increase in bore of the tube.

29. A method as defined in claim 23, wherein the adhesive comprises a layer of non-setting adhesive to which the flexible material is bonded.

30. A method as defined in claim 23, wherein the adhesive comprises a release tape protecting an exposed surface of the adhesive.

31. A method as defined in claim 30, wherein the release tape is reinforced in a direction axially of the tube.

32. A method as defined in claim 23, in the liner comprises metal.

33. A method as defined in claim 23, wherein the liner comprises a polymeric material.

34. A method as defined in claim 23, wherein the liner comprises a thermoplastic elastomer.

35. A method as defined in claim 23, wherein the liner comprises thermoplastic polyurethane.

36. A method as defined in claim 34, wherein the liner comprises a polymeric material which is cross-linked.

37. A method as defined in claim 23, wherein the liner comprises a material approved for use in contact with potable water.

38. A method as defined in claim 23, wherein the liner is folded whereby its greatest lateral dimension is less than the diameter of the tube.

39. A method as defined in claim 38, wherein the tube is formed to a cruciform shape and then flattened.

40. A method as defined in claim 23, wherein the adhesive comprises a material a major component of which is butyl rubber.

41. A pipe, lined with a liner as defined in claim 1.

* * * * *